(12) United States Patent
Tsutsumi et al.

(10) Patent No.: US 10,530,058 B2
(45) Date of Patent: Jan. 7, 2020

(54) WIRELESS DEVICE

(71) Applicant: KABUSHIKI KAISHA TOSHIBA, Minato-ku (JP)

(72) Inventors: Yukako Tsutsumi, Kawasaki (JP); Koji Akita, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/691,889

(22) Filed: Aug. 31, 2017

(65) Prior Publication Data

US 2018/0212327 A1 Jul. 26, 2018

(30) Foreign Application Priority Data

Jan. 23, 2017 (JP) .................................. 2017-009757

(51) Int. Cl.
| | | |
|---|---|---|
| *H01Q 9/04* | (2006.01) | |
| *H01Q 1/52* | (2006.01) | |
| *H01Q 3/34* | (2006.01) | |
| *H01Q 1/48* | (2006.01) | |
| *H01Q 19/06* | (2006.01) | |
| *H01Q 17/00* | (2006.01) | |
| *G11B 7/1372* | (2012.01) | |

(52) U.S. Cl.
CPC ............. *H01Q 9/0464* (2013.01); *H01Q 1/48* (2013.01); *H01Q 1/52* (2013.01); *H01Q 3/34* (2013.01); *H01Q 17/00* (2013.01); *H01Q 19/065* (2013.01); *G11B 2007/13722* (2013.01)

(58) Field of Classification Search
CPC .... H01Q 9/0464; H01Q 9/0485; H01Q 13/18; H01Q 9/0428; H01Q 17/001; H01Q 9/0407; H01Q 11/14; H01Q 25/007; H01Q 19/062–065; G01T 1/295; G11B 2007/13722

See application file for complete search history.

(56) References Cited

U.S. PATENT DOCUMENTS 5,627,553 A * 5/1997 Poulton .................. H01Q 15/04
  333/21 A
6,366,245 B1 * 4/2002 Schmidt .................. G01S 7/032
  343/700 MS (Continued)

FOREIGN PATENT DOCUMENTS

| JP | 2002-185243 A | 6/2002 |
| JP | 2018-121126 A | 8/2018 |

*Primary Examiner* — Ricardo I Magallanes
(74) *Attorney, Agent, or Firm* — Oblon, McClelland, Maier & Neustadt, L.L.P.

(57) ABSTRACT

A wireless device according to one aspect of the present invention includes an antenna, a focuser, and an absorber. The focuser includes a first and a second region. One of the regions transmits radio waves, and the other blocks them or changes their phase. In a plan view from the antenna, the shape of the first region is a circle and the shape of the second region is an annular ring with an inner diameter equal to the diameter of the first region. The antenna is on the center axis of the circle. A part of the absorber is present between a first plane where the antenna is present and a second plane on which the second region is present. The absorber is present at a position away from the antenna by the outer circumference of the annular ring or longer in a direction perpendicular to the axis.

14 Claims, 9 Drawing Sheets

(56) References Cited

U.S. PATENT DOCUMENTS

| | | | |
|---|---|---|---|
| 2008/0218418 A1* | 9/2008 | Gillette | H01Q 1/38 |
| | | | 343/700 MS |
| 2008/0309545 A1* | 12/2008 | Sabet | G01S 7/03 |
| | | | 342/104 |
| 2010/0060535 A1* | 3/2010 | Tiezzi | H01Q 1/3275 |
| | | | 343/770 |
| 2011/0050509 A1* | 3/2011 | Ayala Vazquez | H01Q 1/2266 |
| | | | 343/702 |
| 2018/0212328 A1 | 6/2018 | Akita et al. | |

\* cited by examiner

| ITEM | WITHOUT RADIO WAVE ABSORBER | D=0 [mm] | D=4 [mm] |
|---|---|---|---|
| FRONT ANTENNA GAIN [db] | 16.0 | 12.5 | 16.7 |
| FRONT DIRECTIVITY GAIN [db] | 17.3 | 16.6 | 19.6 |
| EMISSION EFFICIENCY [db] | −1.3 | −4.1 | −2.9 |
| E-PLANE SIDE LOBE LEVEL [db] | −12.1 | −13.8 | −13.5 |

| ITEM | D=4 [mm] FLUSH | D=4 [mm] HIGHER LEVEL |
|---|---|---|
| FRONT ANTENNA GAIN [db] | 16.7 | 17.5 |
| FRONT DIRECTIVITY GAIN [db] | 19.6 | 21.6 |
| EMISSION EFFICIENCY [db] | −2.9 | −4.1 |
| E-PLANE SIDE LOBE LEVEL [db] | −13.5 | −14.7 |

FIG. 13

WIRELESS DEVICE

CROSS-REFERENCE TO RELATED
APPLICATION(S)

This application is based upon and claims the benefit of priority from Japanese Patent Application No. 2017-009757, filed Jan. 23, 2017; the entire contents of which are incorporated herein by reference.

FIELD

Embodiments described herein relate generally to a wireless device.

BACKGROUND

Fresnel zone plates offer focusing effects that focus radio waves and increase energy density. Accordingly, antenna devices that include Fresnel zone plates in front are known to improve antenna gain in front. For this reason, an antenna device including a Fresnel zone plate can transmit a radio frequency (RF) signal contained in radio waves to a farther point than an antenna device that does not have a Fresnel zone plate.

However, if high antenna gains are obtained in directions other than the front direction, a problem arises that delayed waves are transmitted and received due to multipath effects and the communication performance of the antenna degrades.

BRIEF DESCRIPTION OF THE DRAWINGS

FIG. 13 is a table showing values in the simulation results in FIG. 12.

DETAILED DESCRIPTION

A wireless device according to one embodiment of the present invention suppresses antenna gain in directions other than specific directions while keeping antenna gain in the specific directions high.

A wireless device according to one aspect of the present invention includes an antenna, a focuser, and a radio wave absorber. The focuser includes at least a first region and a second region. One of the first region and the second region transmits radio waves, and the other blocks radio waves or changes the phase of radio waves. The shape of the first region is a circle in a plan view from the antenna. The shape of the second region is an annular ring with an inner diameter equal to the diameter of the first region in a plan view from the antenna. The antenna is on the center axis of the circle of the first region. At least part of the radio wave absorber is present between a first plane which is perpendicular to the center axis and on which the antenna is present and a second plane which is perpendicular to the center axis and on which the second region is present. The radio wave absorber is present at a position away from the antenna by the outer circumference of the annular ring of the second region or longer in a first direction perpendicular to the center axis.

Below, a description is given of embodiments of the present invention with reference to the drawings. The present invention is not limited to the embodiments.

First Embodiment

Figure 1A:
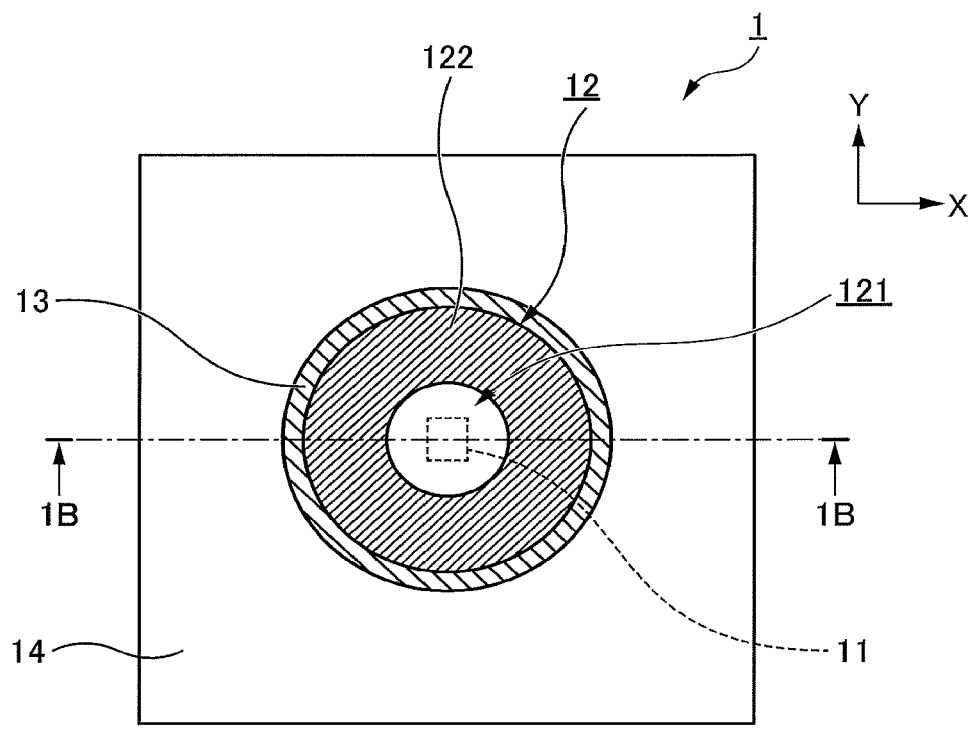
FIGS. 1A and 1B are diagrams showing a first example of a wireless device according to a first embodiment.
Figure 1B:
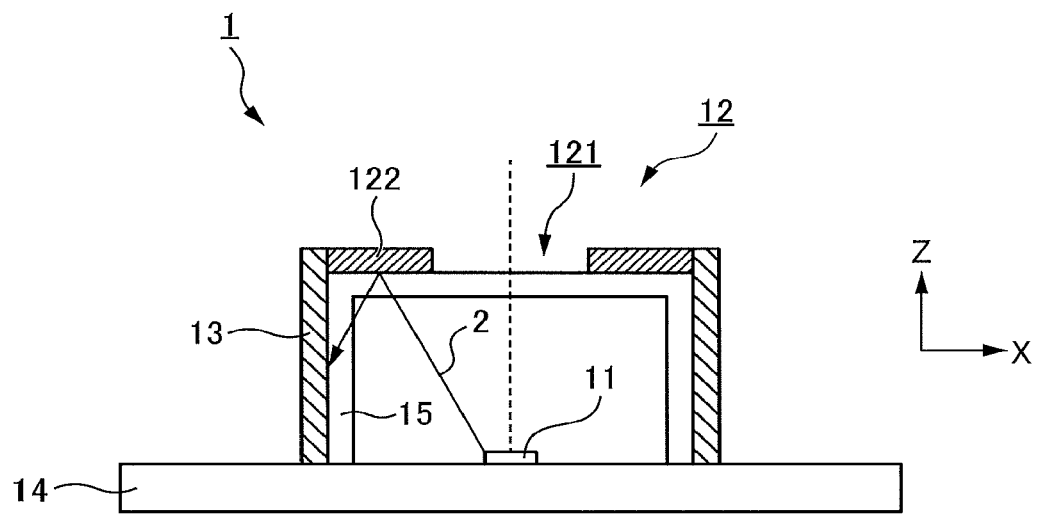

FIGS. 1A and 1B are diagrams showing a first example of a wireless device according to a first embodiment. FIG. 1A is a plan view. FIG. 1B is an end view along line 1B-1B shown in FIG. 1A. A wireless device 1 according to the first embodiment includes an antenna 11, a focuser (annular structure) 12, and a radio wave absorber 13. The focuser 12 includes at least a first region 121 and a second region 122.

In addition, the wireless device 1 shown in FIGS. 1A and 1B includes a substrate 14 and a fixer 15. The top surface of the substrate 14 has the antenna 11 mounted thereon, the top surface of the fixer 15 has the focuser 12 mounted thereon, and the side of the fixer 15 has the radio wave absorber 13 mounted thereon. However, the substrate 14 and the fixer 15 are shown for convenience of explanation of the positions of the components in the first embodiment. The substrate 14 and the fixer 15 are therefore not necessarily provided. For example, the substrate 14 and the fixer 15 may be a part of the focuser 12. Further, other components may be included in the wireless device 1.

Suppose that the direction parallel with the center axis (indicated by the dotted line in FIG. 1B) of the circle of the first region 121 is the vertical direction. In addition, the Z axis of the rectangular coordinate system indicates the vertical direction. Therefore, the X-Y plane is a horizontal plane vertical to the center axis. The direction extending from the antenna 11 to the first region 121 is the upward direction. On the horizontal plane, the side adjacent to the antenna 11 is referred to as inner side, and the side remote from the antenna 11 is referred to as outer side.

The antenna 11 performs transmission, reception, or both of radio waves related to RF signals. There is no limitation on the type of the antenna 11. When the antenna 11 is a flat antenna, for example, a patch antenna, a dipole antenna, a monopole antenna, an inverted-F antenna, or the like may be used. When the antenna 11 is other than a flat antenna, for example, a chip antenna, a dielectric antenna, a waveguide antenna, or the like may be used. It should be noted that these are merely illustrative and the antenna 11 is not limited to these antennas.

The focuser 12 provides focusing effects that allow radio waves transmitted or received by the antenna 11 to be focused so that energy density can increase. For this reason, the focuser 12 has a portion for obtaining focusing effects, and the antenna gain of the wireless device 1 increases from the antenna 11 side to the side of the portion for obtaining focusing effects.

The first region 121 and the second region 122 of the focuser 12 are portions for obtaining focusing effects. The first region 121 and the second region 122 are distinguished by whether they are a region that transmits radio waves (radio wave transmitting region) or a region that does not transmit radio waves (radio wave non-transmitting region). Alternatively, they are distinguished by whether they are a region that transmits radio waves (radio wave transmitting region) or a region that changes the phase of radio waves (radio wave phase changing region). In other words, one of the first region 121 and the second region 122 transmits radio waves. The other region blocks radio waves or changes the phase of radio waves.

The radio wave transmitting region may be made of a material (radio wave transmitting material) that transmits radio waves, such as a dielectric. Alternatively, the radio wave transmitting region may be made of air. In other words, the radio wave transmitting region may be a through hole provided in the focuser 12. The radio wave non-transmitting region is made of a material that does not transmit radio waves (radio wave non-transmitting material), such as metal. Use of metal as a radio wave non-transmitting material enhances signal shielding, thereby increasing focusing effects. The radio wave phase changing region is made of a material that transmits radio waves and can change the phase of radio waves (radio wave phase changing material), such as a dielectric. Use of a dielectric as a radio wave phase changing material makes the focuser 12 light compared with use of metal as a radio wave non-transmitting material.

The shape of the first region 121 is circular in a plan view from the antenna 11. The shape of the second region 122 is an annular ring the inner diameter of which is equal to the diameter of the first region 121 in a plan view from the antenna 11. It should be noted that these plan views are not necessarily actually visible. In addition, the antenna 11 is on the center axis of the circle of the first region 121.

With these characteristics, the first region 121 and the second region 122 of the focuser 12 function in the same manner as a Fresnel zone plate. A typical Fresnel zone plate has a configuration that alternately includes an annular ring, which transmits radio waves generally, and an annular ring, which blocks radio waves. However, the innermost region in the Fresnel zone plate is not annular but circular.

In the Fresnel zone plate, the annular ring that transmits radio waves and the annular ring that blocks radio waves correspond to the n-th (n is an integer of one or more) Fresnel zone and the (n+1)-th Fresnel zone, respectively. Thus, the Fresnel zone plate blocks radio waves with the phase opposite to that of radio waves that it transmits, and mutually intensifies transmitted radio waves at the focus (the position of another wireless device that receives radio waves), thereby providing focusing effects.

Suppose, for example, that the first region 121 transmits radio waves, and the second region 122 blocks radio waves. In this supposition, as shown in FIG. 1B, the focuser 12 has an inner circle serving as a through hole and may be a plate having an annular shape (annular plate) made of a metal. The inner circle of the annular plate corresponds to the first region 121, and the annular plate itself corresponds to the second region 122. Alternatively, a disc-shaped plate may be used in which the inner circle of the annular plate is inset with a dielectric. In addition, the distance between the annular plate and the antenna 11 and the size of the annular plate are adjusted such that radio waves passing through the first Fresnel zone passes through the inner circle of the annular plate and at least part of radio waves passing through the second Fresnel zone is blocked by (reflected off) the annular plate. Thus, radio waves mutually reinforce at the focus and the wireless device 1 obtains a higher upward antenna gain.

It should be noted that in a plan view of the antenna 11, there is no limitation on the position of the second region 122 along the vertical direction if the second region 122 has an annular shape with an inner diameter equal to the diameter of the first region 121. Although FIG. 1B shows the annular plate is positioned upper than the top surface of the fixer 15, the annular plate may be positioned lower than the top surface of the fixer 15 or may be contained in the top surface.

The focuser 12 may include other regions than the regions for obtaining focusing effects and these other regions in the focuser 12 may have any configuration. For this reason, the configuration of the focuser 12 may vary depending on the configuration, application, and the like of the wireless device 1. For example, the focuser 12 may be a three-dimensional structure freestanding on the substrate 14.

It should be noted that focusing effects are provided depending on blocked radio waves. For this reason, if radio waves passing through a Fresnel zone to be shielded are not completely blocked but partly blocked, focusing effects can be obtained depending on the blocked radio waves.

It should be noted that if, on the horizontal plane on which the second region 122 is present, the inner edge of the annular ring of the second region 122 is positioned on the boundary between the first Fresnel zone and the second Fresnel zone and the outer edge of the annular ring is positioned on the boundary between the second Fresnel zone and the third Fresnel zone, radio waves passing through the second Fresnel zone are all blocked, thereby increasing focusing effects.

On the horizontal plane, the length of the Fresnel zone in the radial direction depends on the distance between the antenna 11 and the horizontal plane, the wavelength of RF signals, and the distance between the antenna 11 and the receiver of RF signals. The Fresnel zone radius R on the horizontal plane is expressed by the following expression where the distance between the antenna 11 and the horizontal plane is d, the wavelength of RF signals is $\lambda$, and the distance between the antenna 11 and the receiver of RF signals is D.

$$R_n(d) = \sqrt{\frac{n\lambda d(D-d)}{D}} \qquad \text{[Expression 1]}$$

Here, n is the order of Fresnel zone. For the second Fresnel zone, n is 2. Fresnel zone radius R represents the distance in the horizontal direction from the center axis to the boundary along the outer side of the Fresnel zone. Therefore, in the case shown in FIG. 1B, if the inner diameter of the annular ring of the second region 122 is larger than $2R_1(d)$ and the outer diameter of the annular ring of the second region 122 is smaller than $2R_2(d)$, the second region 122 blocks radio waves passing through the second Fresnel zone but does not block radio waves passing through the first Fresnel zone and the third Fresnel zone. In this manner, the size and position of the second region 122 are determined depending on the distance between the wavelength of a target RF signal and the receiver of the RF signal. For example, if the wavelength of the RF signal and the position of the second region 122 in the vertical direction are determined, the allowable range of the width of the annular ring of the second region 122 (the length between the inner diameter and the outer diameter) is determined.

If distance D can be regarded as being adequately greater than distance d, the aforementioned expression can be approximately expressed as the following expression.

$$R_n(d) = \sqrt{n\lambda d + \left(n\frac{\lambda}{2}\right)^2}$$ [Expression 2]

For example, if the RF signals are microwaves and the outer diameter of the annular ring of the second region 122 is about 20 cm, changing RF signals to millimeter-waves results in the outer diameter of the annular ring of the second region 122 of about 10 mm. Therefore, in the case where the RF signals are millimeter-waves, the first region 121 and the second region 122 can be made smaller than in the case of microwaves.

It should be noted that the first region 121 may block radio waves and the second region 122 may transmit radio waves. For example, the focuser 12 is a disc-shaped plate in which the inner circle of the annular plate made of a radio wave transmitting material is inset with a radio wave non-transmitting material. In addition, the distance between the annular plate and the antenna 11 and the size of the annular plate are adjusted such that radio waves passing through the first Fresnel zone are blocked by the inner circle of the annular plate and radio waves passing through the second Fresnel zone pass through the annular plate. In this case, radio waves passing through the second Fresnel zone reach the receiver. Since radio waves having the opposite phase to that of radio waves passing through the second Fresnel zone are blocked, radio waves passing through the second Fresnel zone can obtain focusing effects.

In this manner, to shield a target Fresnel zone, the focuser 12 includes at least the first region 121 and the second region 122, and one of the first region 121 and the second region 122 transmits radio waves, and the other blocks radio waves.

It should be noted that, in the above description, the first region 121 or the second region 122 blocks radio waves. However, instead of blocking radio waves, it may change the phase of radio waves. For example, the annular plate may be made of a radio wave phase changing material. In this case, both the first region 121 and the second region 122 transmit radio waves; however, the lengths of the second region 122 in the vertical direction are adjusted so that the phases of radio waves passing through the first region 121 and radio waves passing through the second region 122 cannot be opposite. Such adjustment reduces a component canceling out radio waves, so that radio waves can obtain focusing effects.

In addition, in the above case, the lengths (thicknesses) of the first region 121 and the second region 122 in the direction in which radio waves are transmitted are desirably adjusted so that radio waves passing through the first region 121 and radio waves passing through the second region 122 can be in phase with each other. This provides mutual reinforcement between radio waves passing through the radio wave non-transmitting region and radio waves passing through the radio wave transmitting region, thus further increasing focusing effects.

Alternatively, the radio wave phase changing region may be round cornered. With round corners of the radio wave phase changing region, dispersion of radio waves due to corners can be prevented and a problem of a reduction in focusing effects due to dispersion can be eased.

There is no limitation on the methods of forming the radio wave transmitting region, the radio wave non-transmitting region, and the radio wave phase changing region. For example, the first region 121 and the second region 122 may be formed by bonding the radio wave transmitting material to the radio wave non-transmitting material. The first region 121 and the second region 122 may be formed by coating a surface of the radio wave transmitting material with the radio wave non-transmitting material.

As described above, the focuser 12 can have various configurations. The focuser 12 may be configured with a plurality of structures. Similarly, the first region 121 and the second region 122 may be configured with a plurality of structures. For example, a single annular plate may be formed by a combination of two U-shaped plates.

There is no limitation on the method of fixing the focuser 12 to the wireless device 1. Fixation may be made through an adhesive. Alternatively, fixation may be made through threads, for example. The wireless device 1 may include a mounting portion to which the focuser 12 is mounted by partial insertion or hooking of the focuser 12. If the mounting portion allows the focuser 12 to be detached therefrom, exchange of the focuser 12 is possible. Therefore, the specifications of the antenna 11 can be easily changed depending on the application of the wireless device 1. For example, the focuser 12 used may be changed depending on whether it wirelessly communicates with an adjacent wireless device or wirelessly communicates with a remote wireless device.

The radio wave absorber 13 absorbs radio waves. The radio wave absorber 13 is formed of a material that absorbs radio waves (a radio wave absorbing material). It should be noted that not entire the radio wave absorber 13 should be formed of a radio wave absorbing material. For example, when a radio wave non-absorber is coated with a radio wave absorbing material, a part coated with the radio wave absorbing material can be regarded as the radio wave absorber 13.

The position of the radio wave absorber 13 will now be described referring to the example shown in FIGS. 1A and 1B. The radio wave absorber 13 is present at a position away from the antenna 11 by the outer circumference of the annular ring of the second region 122 or longer in the direction perpendicular to the center axis of the first region 121 (in the horizontal direction). In the example shown in FIGS. 1A and 1B, the radio wave absorber 13 is in contact with the outer edge of the annular ring of the second region 122, and the distance between the radio wave absorber 13 and the antenna 11 in the horizontal direction is equal to the distance between the antenna 11 and the outer edge of the annular ring of the second region 122 in the horizontal direction. In addition, at least part of the radio wave absorber 13 is present between the antenna 11 and the second region 122 in a path parallel with the center axis passing the center of the circle of the first region 121 (in the vertical direction). With such arrangement, the radio wave absorber 13 prevents radio waves traveling in the direction in which the annular plate is not positioned. Consequently, the wireless device 1 in this embodiment can suppress side lobe that occurs in a specific direction.

Without the radio wave absorber 13, radio waves travelling in the direction in which the annular plate is not positioned causes side lobe. This side lobe may adversely affect the surrounding wireless system and the like. Besides, the wireless device 1 may receive interference.

Further, if the second region 122 is a radio wave non-transmitting region, the second region 122 generates reflected waves. The radio waves 2 indicated by the solid arrow in FIG. 1B represent radio waves emitted by the antenna 11 and then reflected off the second region 122. These radio waves 2 (reflected waves) may also cause side lobe. For this reason, the communication performance of a wireless device that includes the focuser 12 but does not include the radio wave absorber 13 easily degrades. However, in this embodiment, the radio wave absorber 13 avoids reflected waves traveling in the direction in which the annular plate is not positioned, so that side lobe can be suppressed and the communication performance of the wireless device 1 can be increased.

If the distance from the radio wave absorber 13 to the antenna in the direction perpendicular to the center axis of the first region 121 (in the horizontal direction) is shorter than the outer edge of the annular ring of the second region 122 (is inner than the outer edge), the antenna gain in the vertical direction may decrease.

Figure 2A:
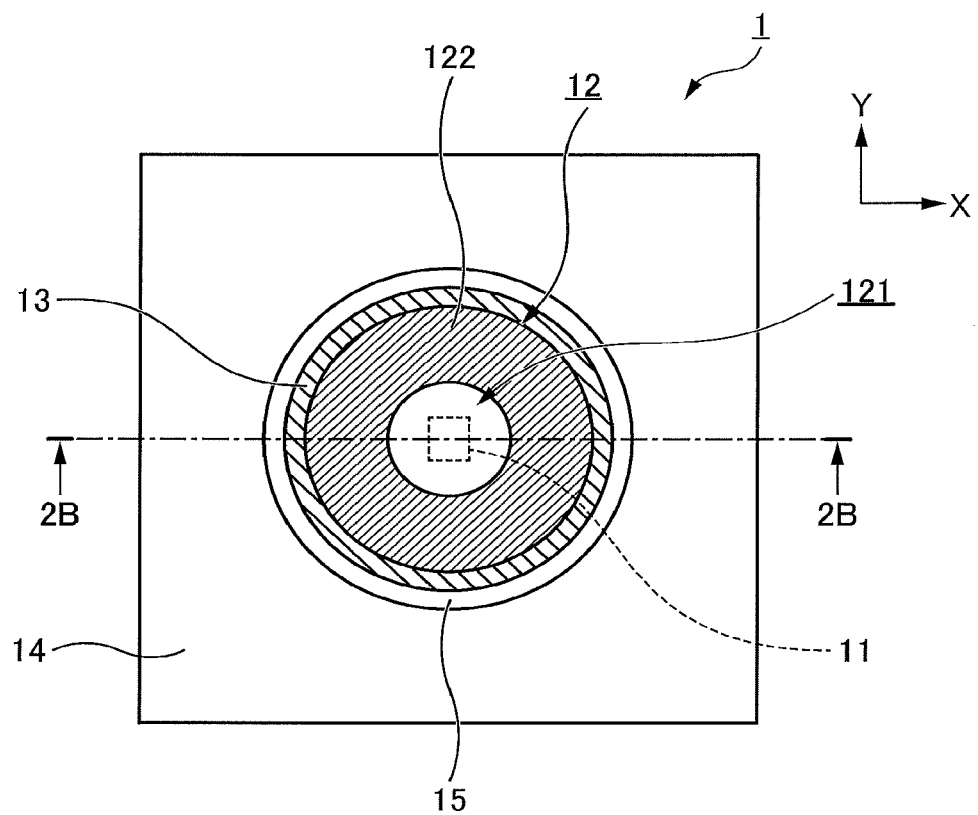
FIGS. 2A and 2B are diagrams showing a second example of the wireless device according to the first embodiment.
Figure 2B:
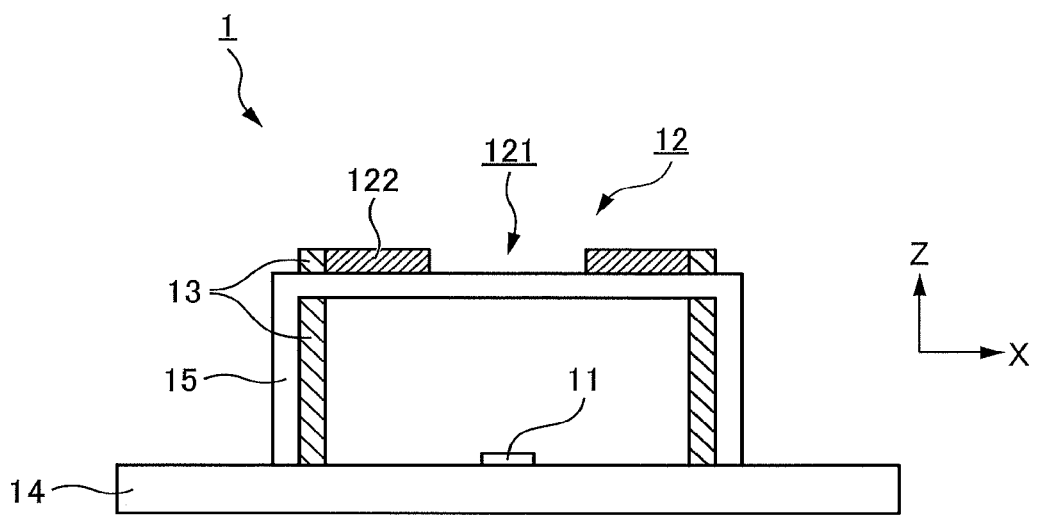

The radio wave absorber 13, which is positioned outer than the fixer 15 in FIGS. 1A and 1B, may alternatively be positioned inner than the fixer 15. FIGS. 2A and 2B are diagrams showing the second example of the wireless device according to the first embodiment. FIG. 2A is a plan view. FIG. 2B is an end view along line 2B-2B shown in FIG. 2A. As shown in FIG. 2, the radio wave absorber 13 may be positioned inner than the fixer 15. Alternatively, the wireless device 1 may include a plurality of radio wave absorbers 13. As shown in FIG. 2B, radio wave absorbers 13 may be placed on upper and lower sides of the top surface of the fixer 15.

The radio wave absorbers 13 shown in FIGS. 1 and 2 are configured surrounding the outer edge of the annular ring of the second region 122. Accordingly, the electromagnetic field outer than the outer edge of the annular ring of the second region 122 can be reduced in all horizontal directions, so that side lobe that occurs in the direction in which the focuser 12 is not positioned can be suppressed.

Figure 3:
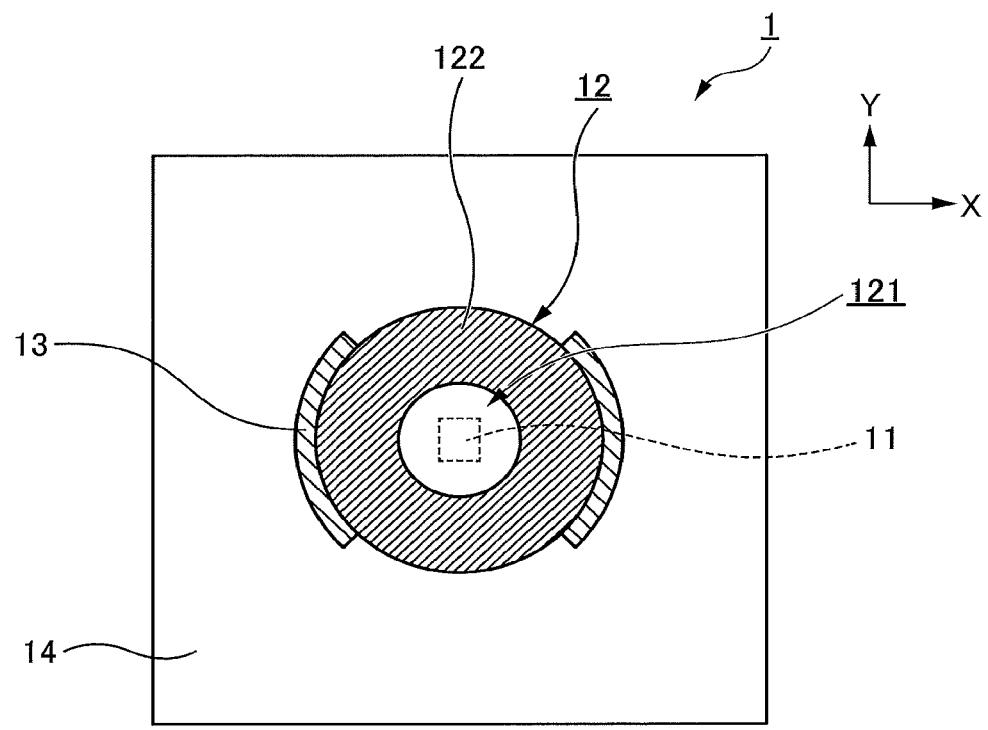
FIG. 3 is a plan view showing a third example of the wireless device according to the first embodiment.

Meanwhile, there is also an advantage of suppressing side lobe in a specific direction. Therefore, the radio wave absorber 13 may be configured surrounding part of the outer edge of the annular ring of the second region 122. FIG. 3 is a plan view showing the third example of the wireless device according to the first embodiment. As shown in FIG. 3, the radio wave absorber 13 is present in a specific horizontal direction and there are other horizontal directions in which the radio wave absorber 13 is absent. For example, the radio wave absorber 13 may be provided in at least one of the directions in which side lobe occurs due to radio waves transmitted or received by the antenna 11 when the radio wave absorber 13 is not provided, thereby suppressing side lobe in that direction.

It should be noted that when radio waves obtaining focusing effects pass through the fixer 15 as shown in FIGS. 1 to 3, it is preferable that the fixer 15 easily transmit radio waves and be made of a material with low relative dielectric constant and dielectric loss tangent. Further, the shorter (thinner) the length (thickness) in the direction in which radio waves are transmitted, the more preferable.

Figure 4:
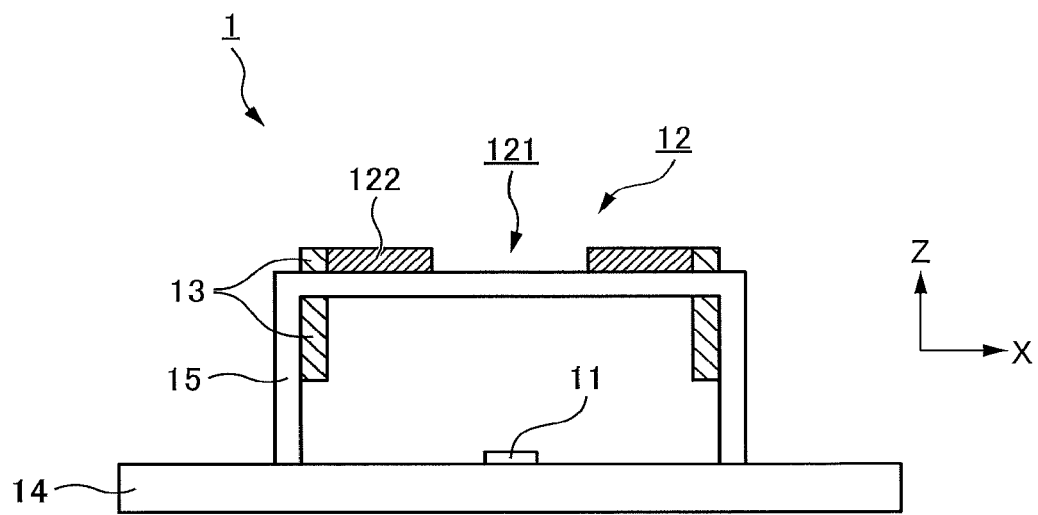
FIG. 4 is an end view showing a fourth example of the wireless device according to the first embodiment.

Although the bottom surface of the radio wave absorber 13 is in contact with the substrate 14 in FIGS. 1 and 2, the bottom surface of the radio wave absorber 13 may be set higher than the top surface of the antenna 11. FIG. 4 is an end view showing the fourth example of the wireless device according to the first embodiment. The plan view of the fourth example is the same as FIG. 1A and therefore is omitted. Even when the bottom surface of the radio wave absorber 13 is higher than the top surface of the antenna 11 as shown in FIG. 4, suppression of side lobe is not completely impossible.

Figure 5A:
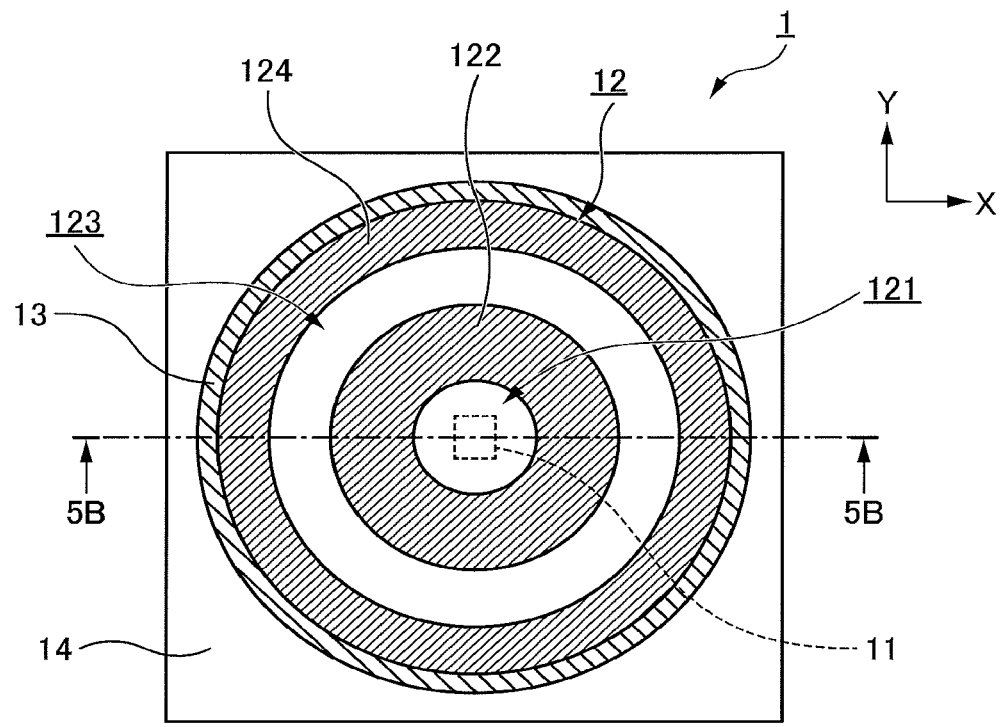
FIGS. 5A and 5B are diagrams showing a fifth example of the wireless device according to the first embodiment.
Figure 5B:
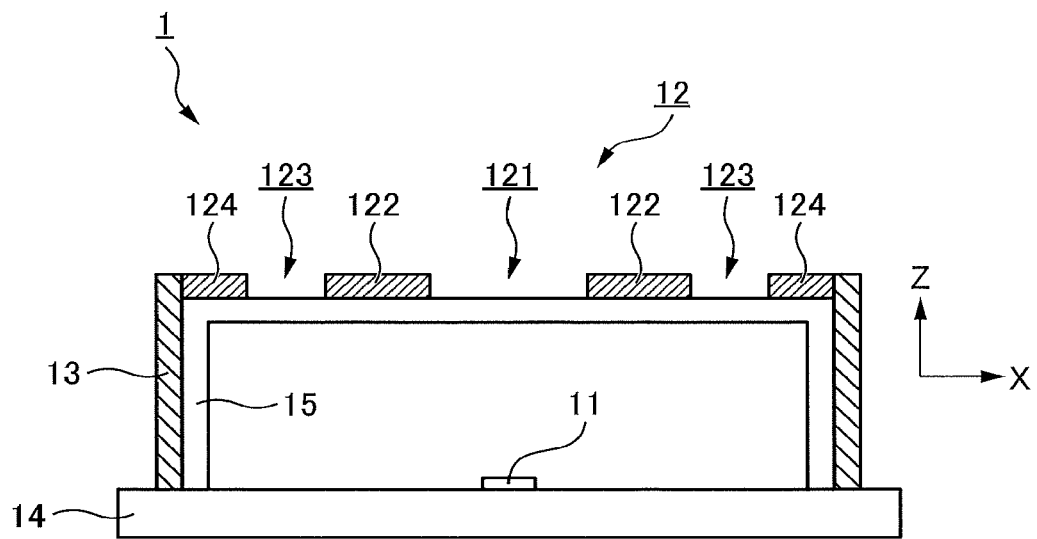

In addition, the focuser 12 may include a plurality of annular regions. In other words, the focuser 12 may include regions other than the first region 121 and the second region 122 as portions for obtaining focusing effects. FIGS. 5A and 5B are diagrams showing the fifth example of the wireless device according to the first embodiment. FIG. 5A is a plan view. FIG. 5B is an end view along line 5B-5B shown in FIG. 5A. FIGS. 5A and 5B show a third region 123 and a fourth region 124 in addition to the first region 121 and the second region 122. The third region 123 and the fourth region 124 are also distinguished by whether they are a radio wave transmitting region, a radio wave non-transmitting region, or a radio wave phase changing region.

To increase focusing effects, radio wave transmitting regions and radio wave non-transmitting regions or radio wave phase changing regions alternate in the radial direction in the first region 121. In the example shown in FIGS. 5A and 5B, the first region 121 and the third region 123 are radio wave transmitting regions, and the second region 122 and the fourth region 124 are radio wave non-transmitting regions. In addition, the first region 121 and the third region 123 transmit radio waves from the odd-numbered Fresnel zones, and the second region 122 and the fourth region 124 block or change the phase of radio waves from even-numbered Fresnel zones.

For example, an annular plate A, an annular plate B, a gap between the annular plate A and the annular plate B, and the size of the gap are adjusted such that the annular plate A blocks radio waves passing through the second Fresnel zone, the annular plate B blocks radio waves passing through the fourth Fresnel zone, and the gap transmits radio waves passing through the third Fresnel zone. This makes upward antenna gain higher than in the case with a single annular plate.

As described above, this embodiment can improve the antenna gain in a specific direction and also suppress side lobe that occurs in directions other than the specific direction.

Second Embodiment

Figure 6A:
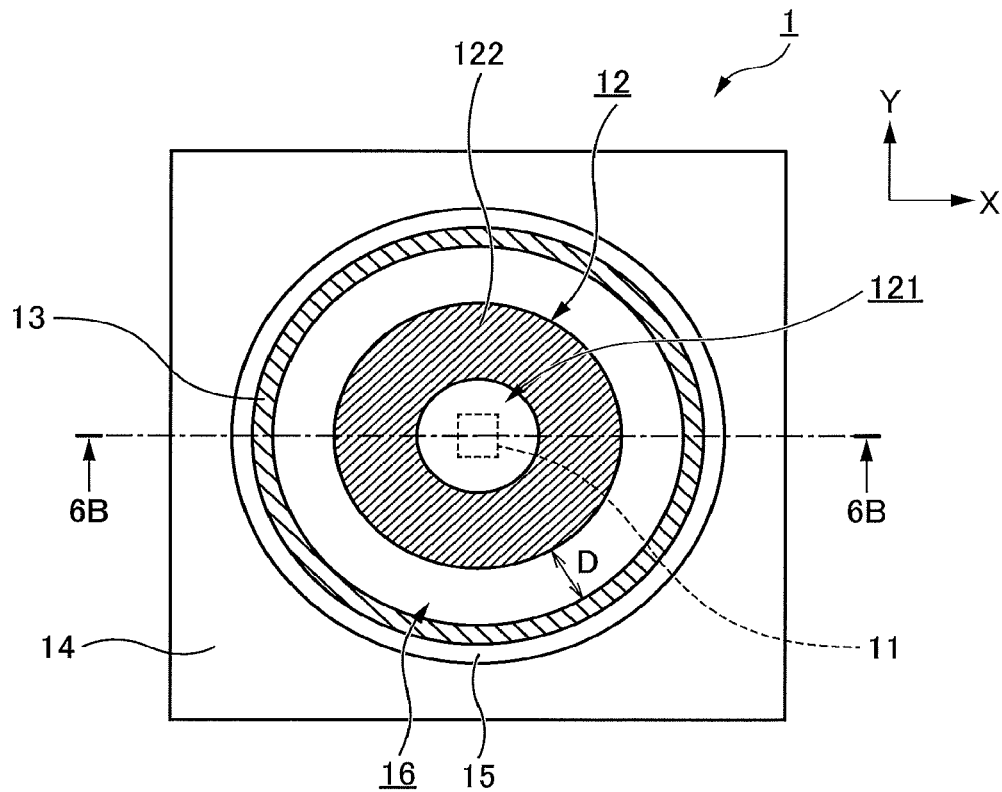
FIGS. 6A and 6B are diagrams showing one example of a wireless device according to a second embodiment.
Figure 6B:
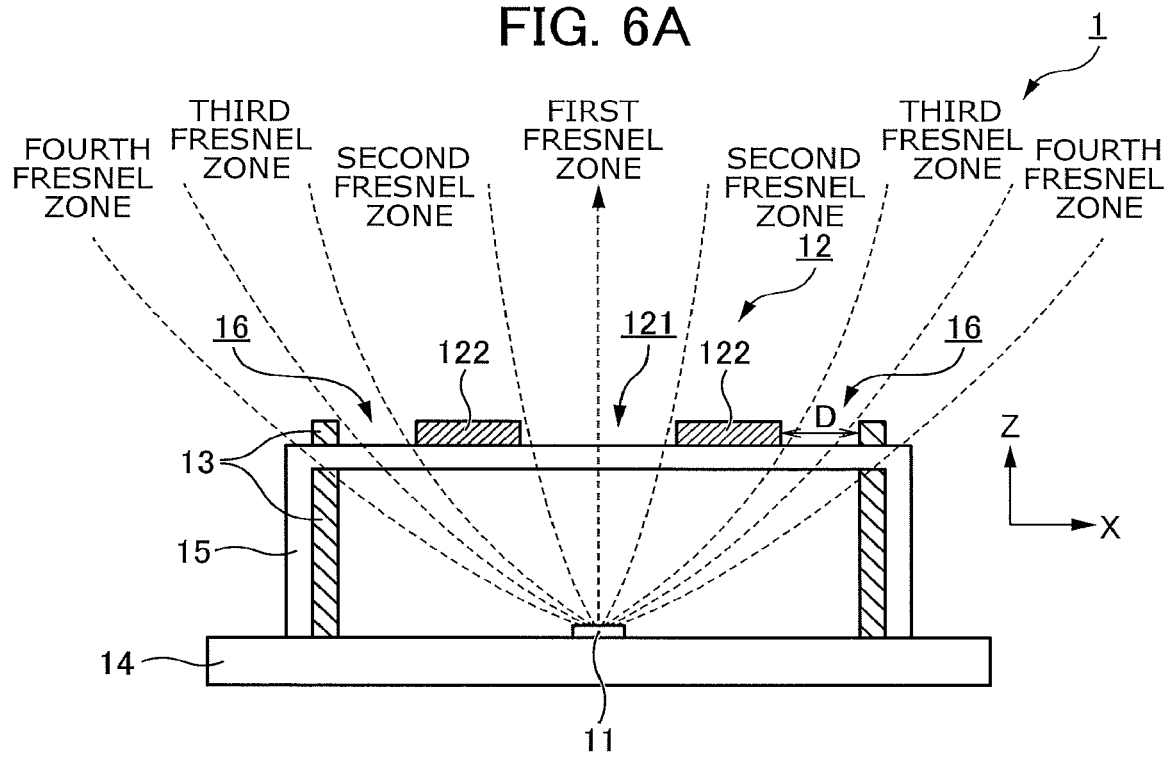

FIGS. 6A and 6B are diagrams showing one example of a wireless device according to a second embodiment. FIG. 6A is a plan view. FIG. 6B is an end view along line 6B-6B shown in FIG. 6A.

The wireless device 1 of the second embodiment differs from the first embodiment in that it includes a gap 16 between the second region 122 and the radio wave absorber 13 on a horizontal plane including the first region 121, the second region 122, and the radio wave absorber 13 as shown in FIGS. 6A and 6B. The length of the gap 16 in the horizontal direction is referred to as distance D.

The description of the same points as in the above-described embodiment will be omitted. For example, the radio wave absorber 13, which is bonded to the inner side of the fixer 15 in FIGS. 6A and 6B, may alternatively be bonded to the outermost side as shown in FIGS. 1A and 1B.

The radio wave absorber 13, which is positioned inner than the fixer in FIGS. 6A and 6B, may alternatively be positioned on the outermost side as shown in FIGS. 6A and 6B.

The gap 16 transmits radio waves. Since the second region 122 and the radio wave absorber 13, which block radio waves, are present on both sides of the gap, the same effects as in the case where one more annular plate blocking radio waves is provided are provided. In other words, upward antenna gain can be made higher, like with the wireless device 1 shown in FIGS. 5A and 5B. In addition, the gap makes the amount of radio waves absorbed by the radio wave absorber 13 lower than in the first embodiment and also improves the emission efficiency of the antenna 11.

In particular, the width (the length in the radial direction) of the gap 16 is preferably adjusted such that all the radio waves passing through specific Fresnel zones can transmit the gap 16. For example, the distance from the center axis to the outer edge of the annular ring of the second region 122 may be smaller than the Fresnel zone radius on the horizontal plane of the n-th Fresnel zone, and the distance from the center axis to the radio wave absorber 13 may be larger than the Fresnel zone radius on the horizontal plane of the (n+1)-th Fresnel zone. For example, in FIGS. 6A and 6B, the distance from the center axis to the outer edge of the annular ring of the second region 122 may be smaller than the Fresnel zone radius on the horizontal plane of the second Fresnel zone, and the distance from the center axis to the radio wave absorber 13 may be larger than the Fresnel zone radius on the horizontal plane of the third Fresnel zone. Therefore, in FIGS. 6A and 6B, the outer edge of the annular ring of the second region 122 is inner than the boundary between the second and third Fresnel zones, and the radio wave absorber 13 is outer than the boundary between the third and fourth Fresnel zones. With this arrangement, radio waves passing through the third Fresnel zone pass through the gap 16 without being blocked by the second region 122 and the radio wave absorber 13. This increases antenna gain. As described above, it is preferable that the width of the gap 16 be adjusted and a Fresnel zone contained in the gap be present.

Figure 7:
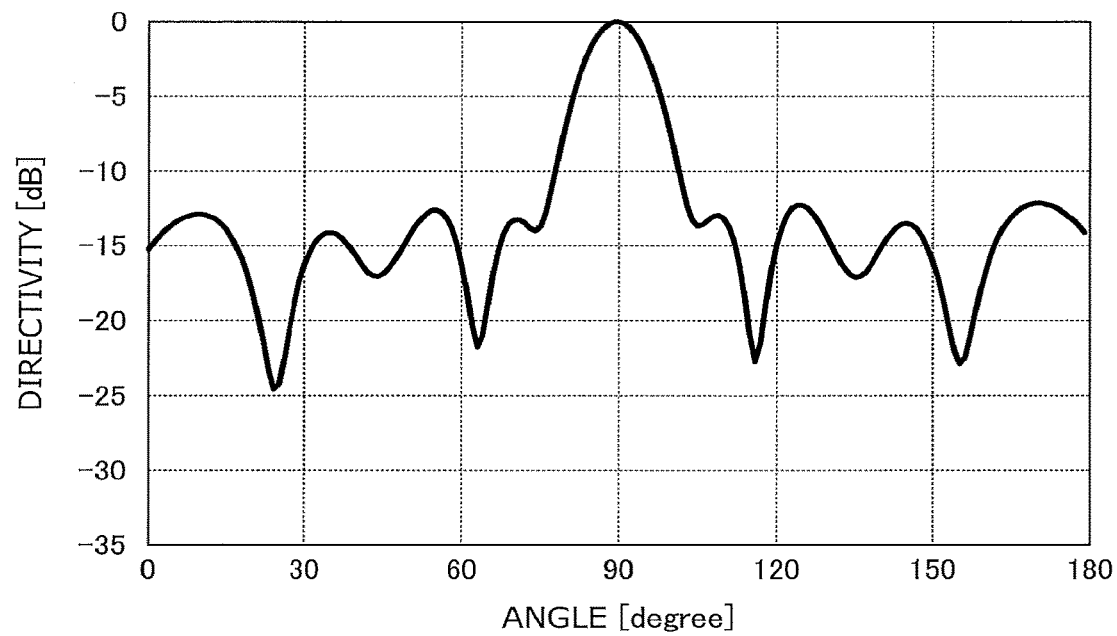
FIG. 7 is a graph showing electromagnetic field simulation results of the first embodiment from which the radio wave absorber is removed.
Figure 8:
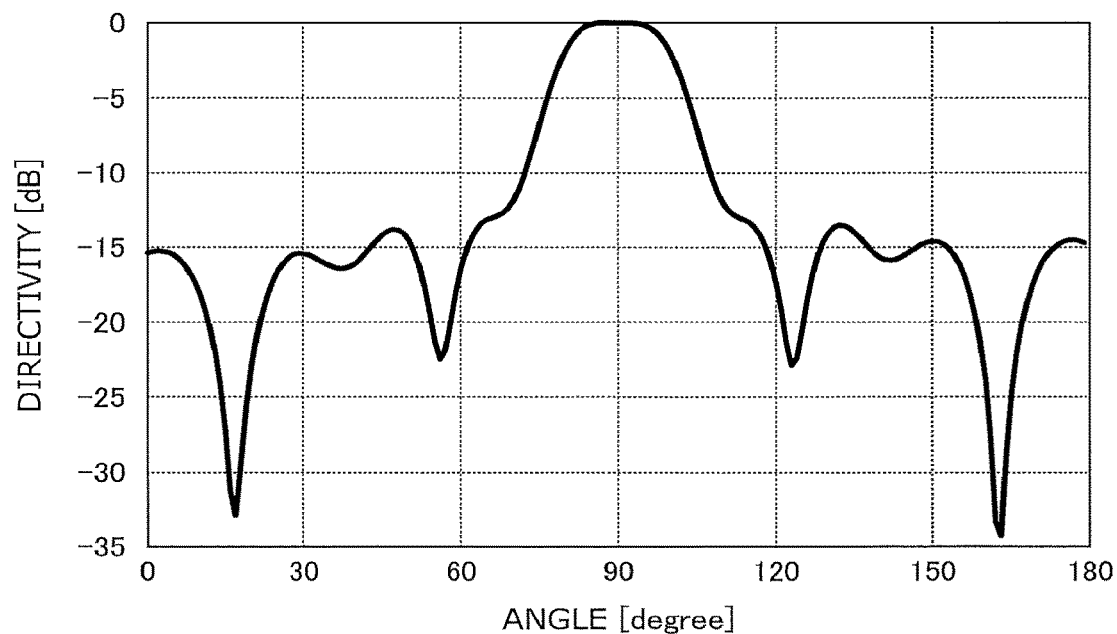
FIG. 8 is a graph showing the electromagnetic field simulation results of the first embodiment.
Figures 9, 10:
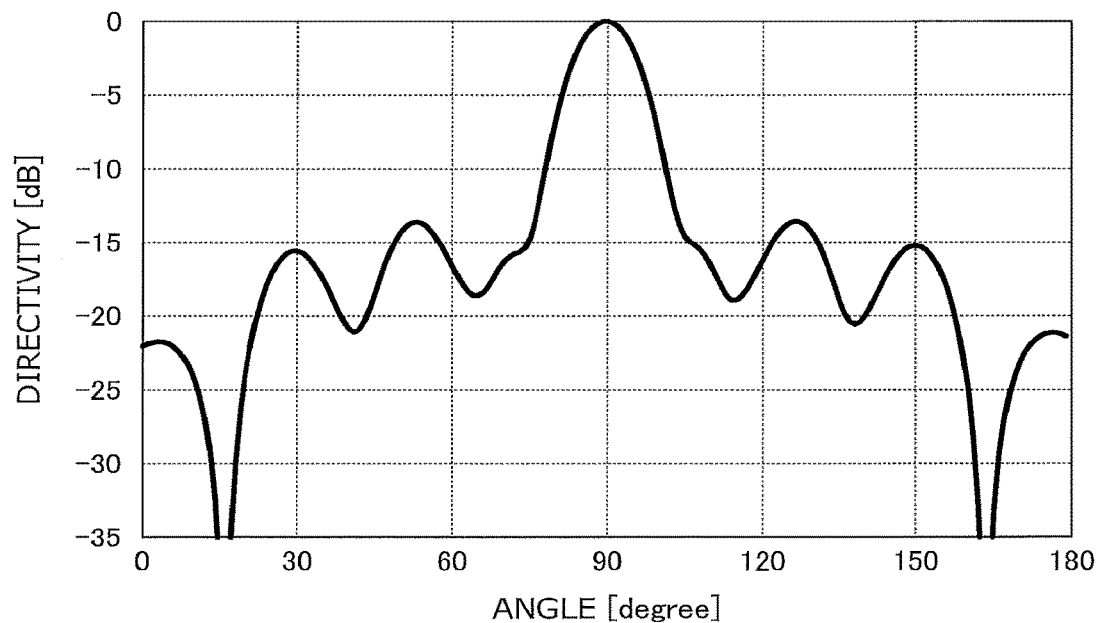
FIG. 9 is a graph showing electromagnetic field simulation results of the second embodiment.
FIG. 10 is a table showing values in the simulation results in FIGS. 7 to 9.

The advantageous effects of the second embodiment will now be explained with the results of electromagnetic field simulation. FIG. 7 is a graph showing the electromagnetic field simulation results of the first embodiment from which the radio wave absorber is removed. FIG. 8 is a graph showing the electromagnetic field simulation results of the first embodiment. FIG. 9 is a graph showing the electromagnetic field simulation results of the second embodiment.

In the simulation model, the antenna 11 was assumed to be a patch antenna, and the annular plate was assumed to be made of a dielectric. Further, the fixer was assumed to have no impact. The operating frequency was 62 GHz.

FIGS. 7 and 8 show emission directivity patterns produced when the gap 16 is absent and the radio wave absorber 13 and the outer edge of the annular plate are in contact with each other. FIG. 9 shows an emission directivity pattern produced when the gap 16 has a width of 4 mm (D=4 mm) and radio waves emitted from the antenna 11 can pass through a Fresnel zone in contact with the gap 16. It should be noted that each graph is normalized by the maximum value.

FIG. 10 is a table showing the values in the simulation results in FIGS. 7 to 9. FIG. 10 shows antenna gain, directivity gain, emission efficiency, and E-plane side lobe level in the table.

As shown in FIG. 10, the case shown in FIGS. 8 and 9 where the radio wave absorber 13 is provided, resulted in a side lobe level lower than in the case shown in FIG. 7 where no radio wave absorber 13 is provided. This shows that the radio wave absorber 13 is effective in suppressing side lobe level.

The upward antenna gain in the first embodiment is lower than in the case where the radio wave absorber 13 is not provided. The main cause is degradation of emission efficiency due to the radio wave absorber 13.

In the second embodiment, emission efficiency, antenna gain, and directivity gain are all improved compared with the first embodiment. The reason of the improvement in emission efficiency was a reduction in the amount of radio waves absorbed in the radio wave absorber 13 due to the gap 16. The reasons of the improvement in directivity gain were focusing effects produced by the side-by-side arrangement of the second region 122, the gap 16, and the radio wave absorber 13, and radio waves in phase with each other were focused for mutual reinforcement.

As described above, this embodiment in which the gap 16 is provided can provide the same advantageous effects as in the case where the number of annular plates is increased, without increasing the number of annular plates.

Third Embodiment

A third embodiment differs from the aforementioned embodiments in that the top surface of the radio wave absorber 13 in the wireless device 1 is higher than the top surface of the radio wave non-transmitting region among the first region 121 and the second region 122. In other words, the top surface of the radio wave absorber 13 is farther from the antenna 11 than the top surface of the radio wave non-transmitting region. It should be noted that a top surface here refers to an end surface distal to the antenna in the direction parallel with the center axis of the first region 121.

Figure 11:
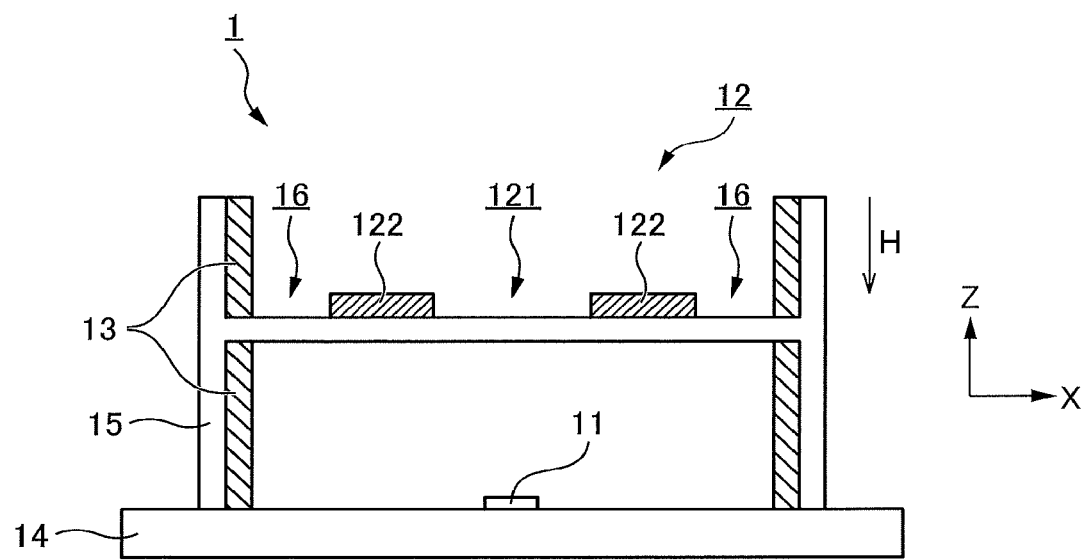
FIG. 11 is an end view showing one example of a wireless device according to a third embodiment.

FIG. 11 is an end view showing one example of a wireless device according to the third embodiment. The length between the top surface of the radio wave absorber 13 and the top surface of the radio wave non-transmitting region in the vertical direction is referred to as distance H. The plan view of the wireless device 1 shown in FIG. 11 is same as FIG. 6A and therefore is omitted.

The description of the same points as in the above-described embodiments will be omitted. For example, although the gap 16 is provided in FIG. 11 like in the second embodiment, the gap 16 is not necessarily provided like in the first embodiment.

If the top surface of the radio wave absorber 13 is higher than the top surface of the radio wave non-transmitting region, more radio waves propagating to outer than the radio wave absorber 13 can be blocked and more side lobe can be suppressed.

It should be noted that the top surface of the radio wave absorber 13 may be partly not higher than the top surface of the radio wave non-transmitting region. For example, specific portions of the top surface of the radio wave absorber 13 may be higher than the top surface of the radio wave non-transmitting region and the other portions of the top surface of the radio wave absorber 13 may be flush with the top surface of the radio wave non-transmitting region. For example, in order to suppress side lobe, the top surface of the radio wave absorber 13 may be higher than the top surface of the radio wave non-transmitting region, in a direction in which side lobe occurs without the radio wave absorber 13.

Figure 12:
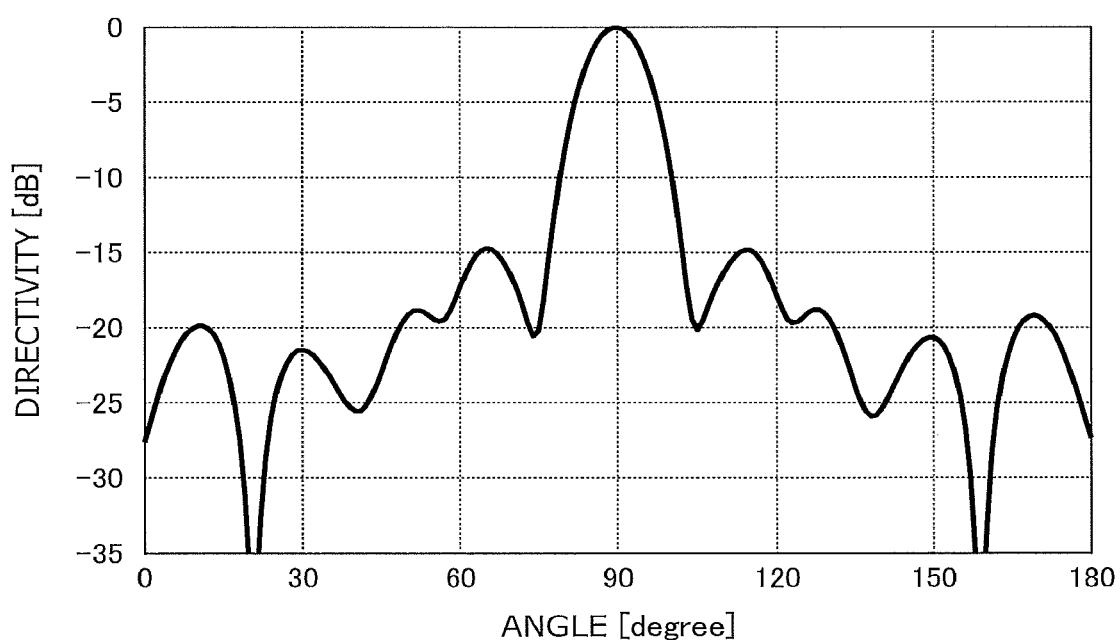
FIG. 12 is a graph showing electromagnetic field simulation results of the third embodiment.

The electromagnetic field simulation results in this embodiment will now be explained. FIG. 12 is a graph showing the electromagnetic field simulation results of the third embodiment. In the electromagnetic field simulation shown in FIG. 12, the operating frequency was 62 GHz and the width of the gap 16 was 4 mm (D=4 mm). The top surface of the radio wave absorber 13 is higher than the top surface of the radio wave non-transmitting region by 6 mm (H=6 mm). In addition, FIG. 12 is normalized by the maximum value.

FIG. 13 is a table showing the values in the simulation results in FIG. 12. FIG. 13 shows antenna gain, directivity gain, emission efficiency, and E-plane side lobe level related to the third embodiment and the second embodiment that has the same configuration as the third embodiment except the position of the top surface of the radio wave absorber 13. This graph proves that the third embodiment yields lower side lobe level than the second embodiment.

As described above, this embodiment can suppress side lobe more than the above-described embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless device comprising:
an antenna emitting or receiving radio waves;
a focuser including at least a circle region and an annular ring region, one of the circle region and the annular ring region providing a transparent transmission of the radio waves, and the other of the circle region and the annular ring region changing phases of the radio waves, wherein the circle region and the annular ring region form a Fresnel zone plate and are configured to focus the radio waves to improve a gain of the antenna, a shape of the circle region is a circle in a plan view from the antenna, a shape of the annular ring region is an annular ring with an inner diameter equal to a diameter of the circle region in the plan view from the antenna, the circle region and the annular ring region have a common center axis, and the antenna is on the center axis; and
a radio wave absorber present in a region away from the center axis by at least a diameter of an outer circumference of the annular ring region and between a first plane which is perpendicular to the center axis and on which the antenna is present and a second plane which is perpendicular to the center axis and on which the annular ring region is present.

2. The wireless device according to claim 1, wherein the radio wave absorber is also present on the second plane, and
on the second plane, a gap is present between the annular ring region and the radio wave absorber.

3. The wireless device according to claim 2, wherein on the second plane,
the distance from the center axis to the outer edge of the annular ring of the annular ring region is smaller than the Fresnel zone radius of an n-th Fresnel zone on the second plane, n being a positive integer, and
the distance from the center axis to the radio wave absorber is larger than the Fresnel zone radius of an (n+1)-th Fresnel zone on the second plane.

4. The wireless device according to claim 1, wherein the radio wave absorber surrounds the outer edge of the annular ring of the annular ring region.

5. The wireless device according to claim 1, wherein the radio wave absorber is positioned in at least one of the directions in which side lobe occurs due to radio waves emitted or received by the antenna if the radio wave absorber is not provided.

6. The wireless device according to claim 1, wherein the annular ring region is formed of a metal.

7. The wireless device according to claim 1, wherein the annular ring region is formed of a dielectric.

8. The wireless device according to claim 7, wherein the length of the annular ring region in a second direction parallel with the center axis is a length that allows radio waves passing through the annular ring region to be in phase with radio waves passing through the circle first region.

9. The wireless device according to claim 1, wherein the end surface of the radio wave absorber distal to the antenna in the second direction parallel with the center axis is farther from the antenna than the end surface of the annular ring region distal to the antenna in the second direction.

10. The wireless device according to claim 1, further comprising a substrate that has the antenna mounted on a surface of the substrate, wherein the radio wave absorber encloses the annular ring region on an outer diameter of the annular ring region and is perpendicular to the surface of the substrate.

11. The wireless device according to claim 10, wherein the radio wave absorber is in direct contact with the surface of the substrate.

12. The wireless device according to claim 1, wherein the radio wave absorber is present in a second annular ring region with an inner diameter equal to or longer than the diameter of the outer circumference of the annular ring region in the plan view from the antenna, and the second annular ring region also has the center axis.

13. A wireless device comprising:
an antenna emitting or receiving radio waves;
a focuser including at least a circle region, a first annular ring region, and a second annular ring region, wherein (1) the circle region and the second annular ring region both provide a transparent transmission of the radio waves, and the first annular ring region blocks the radio waves or changes phases of the radio waves, or (2) the circle region and the second annular ring region both block the radio waves or change phases of the radio waves, and the first annular ring region provides a transparent transmission of the radio waves, and wherein the circle region and the first annular ring region form a Fresnel zone plate and are configured to focus the radio waves to improve a gain of the antenna, a shape of the circle region is a circle in a plan view from the antenna, a shape of the first annular ring region is an annular ring with an inner diameter equal to a diameter of the circle region in the plan view from the antenna, a shape of the second annular ring region is an annular ring with an inner diameter equal to a diameter of an outer circumference of the first annular ring region in the plan view from the antenna, and the circle region, the first annular ring and the second annular ring region have a common center axis, and the antenna is on the center axis; and
a radio wave absorber present in a region away from the center axis by at least a diameter of an outer circumference of the second annular ring region and between a first plane which is perpendicular to the center axis and on which the antenna is present and a second plane which is perpendicular to the center axis and on which the second region is present.

14. A wireless device comprising:

an antenna emitting or receiving radio waves;

a focuser including at least a circle region and an annular ring region, one of the circle region and the annular ring region providing a transparent transmission of the radio waves, and the other of the circle region and the annular ring region blocking the radio waves or changing phases of the radio waves, wherein the circle region and the annular ring region form a Fresnel zone plate and are configured to focus the radio waves to improve a gain of the antenna, a shape of the circle region is a circle in a plan view from the antenna, a shape of the annular ring region is an annular ring with an inner diameter equal to a diameter of the circle region in the plan view from the antenna, the circle region and the annular ring region have a common center axis, the antenna is on the center axis, and the length of the annular ring region in a second direction parallel with the center axis is a length that allows radio waves passing through the annular ring region to be in phase with radio waves passing through the circle region; and a radio wave absorber present in a region away from the center axis by at least a diameter of an outer circumference of the annular ring region and between a first plane which is perpendicular to the center axis and on which the antenna is present and a second plane which is perpendicular to the center axis and on which the annular ring region is present.

* * * * *